United States Patent
Lewis et al.

(10) Patent No.: US 9,734,246 B1
(45) Date of Patent: Aug. 15, 2017

(54) USING "SIGN IN WITH" STATUS AS AN ORACLE FOR SELECTING THIRD PARTY INTENTS

(71) Applicant: Google Inc., Mountain View, CA (US)

(72) Inventors: Justin Lewis, Marina del Rey, CA (US); Gavin James, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 561 days.

(21) Appl. No.: 14/274,595

(22) Filed: May 9, 2014

(51) Int. Cl.
*G06F 17/30* (2006.01)

(52) U.S. Cl.
CPC .... *G06F 17/30864* (2013.01); *G06F 17/3053* (2013.01)

(58) Field of Classification Search
None
See application file for complete search history.

(56) References Cited

U.S. PATENT DOCUMENTS

| | | | |
|---|---|---|---|
| 2011/0208801 A1* | 8/2011 | Thorkelsson | H04L 67/2814 709/203 |
| 2012/0124035 A1* | 5/2012 | Vaidyanathan | G06F 17/30964 707/723 |
| 2013/0159930 A1* | 6/2013 | Paretti | G06F 3/048 715/821 |
| 2015/0310113 A1* | 10/2015 | Yi | G06F 17/30864 707/706 |
| 2015/0346961 A1* | 12/2015 | Cui | G06F 9/445 715/838 |

* cited by examiner

*Primary Examiner* — Son T Hoang
(74) *Attorney, Agent, or Firm* — Lowenstein Sandler LLP (57) ABSTRACT

In a method and system for ranking suggested applications, a set of applications providing a functionality to be offered to a user of a user device is determined, and a login state for the user for each of the set of applications is identified. A ranking of the set of applications based on each of the corresponding login states is determined, and a list of recommended applications for the functionality in view of the ranking is determined. The list of recommended applications is the provided to the user via the user device.

22 Claims, 6 Drawing Sheets

USING "SIGN IN WITH" STATUS AS AN ORACLE FOR SELECTING THIRD PARTY INTENTS

TECHNICAL FIELD

Aspects of the present disclosure relate to the field of content sharing and, more particularly, to a method for ranking applications for content sharing.

BACKGROUND

On the Internet, content hosting websites or other applications allow users to upload, view, and share digital content. Such digital content may include audio clips, movie clips, TV clips, and music videos, as well as amateur content such as video blogging, short original videos, pictures, photos, etc. Other applications on the Internet allow users to implement functionalities (e.g., intents) such as editing a photo, purchasing a good or service, playing a video, opening a web page, requesting directions, storing content, etc. Users can sign into (or log into) these applications via a provider service, such as a content provider, search provider, or online social network provider. Users can potentially be overwhelmed by the number of applications available for sharing or implementing functionalities and the different procedures for using these applications.

SUMMARY

In some implementations, a method includes determining a set of applications providing a functionality to be offered to a user of a user device, identifying a login state for the user for each of the set of applications, determining a ranking of the set of applications based on each of the corresponding login states, determining a list of recommended applications for the functionality in view of the ranking, and causing the list of recommended applications to be provided to the user via the user device.

In implementations, the functionality can be to search for a term or to share a content item, wherein the set of applications are online social networks. The ranking can be further based on the user's interaction history with each of the set of applications. The user's interaction history can include an ordering of the set of application based on a last time of interaction of the user with each of the set of applications.

In implementations, the list of recommended applications can consist of applications that the user is logged into. Applications that the user is logged into can be ranked higher than applications that the user is not logged into. The login state for each of the set of applications can be identified based on whether the user logged into the application via the server.

In implementations, the method can include identifying the functionality based on an action of the user on the user device. The method can include receiving a request from the user for an application to provide the functionality.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the disclosure pertain to a method of ranking applications that provide a functionality, such as sharing content via third party content sharing services or fulfilling an intent. In embodiments, specific functionalities desired by or offered to a user, such as sharing content, storing data, uploading and/or storing data, searching based on a term, etc., can be applied to a set of applications, and that set of applications can be modified or ordered based on the login state of the user for each of the applications. For example, applications that the user is logged into can be recommended or recommended more highly for the functionality or intent than applications that the user is not logged into.

Applications as referred to herein can represent online social networks, content sharing services, retail websites, online information providers, and other online enterprises, and can be accessible to users via the Internet (e.g., using a web browser) or via mobile applications running on user devices.) These online enterprises can financially benefit from increased user traffic. However, as a result of increasing numbers of applications competing for users and users turning away from larger, more general, centralized applications to more specialized applications, attracting users to a general, centralized application has become increasingly challenging. A centralized application is referred to herein to an application that has a very larger user base including users with very different interests and has significantly more traffic than a specialized application. For example, a centralized application may be a popular social network that is visited by a large number of users on a daily and often hourly basis to interact with social contacts. A specialized application is referred to herein to an application that provides a particular functionality and has only users who are interested in this particular functionality. For example, a specialized application may be a video editing application or an online retailer application that has a significantly smaller number of users than a centralized application.

The specialized applications could benefit by offering a "sign in with" option to their users to sign in to their application, where, via a user device, the users can sign in using their username and password from a general, centralized application. For example, a user can use the "sign in with" option to sign in (or log in) to a Specialized Application P, which is narrowly focused on allowing users to share lifestyle content, through Centralized Application G, which is a general online social network. When the user navigates to a Specialized Application P (e.g., a login page or home page), the user could be given the option to sign in with a username and password for Specialized Application P or to sign in through Centralized Application G using the user's username and password for Centralized Application G. If the user signs in to Centralized Application G, then the user will be signed into (or logged into) both Specialized Application P and Centralized Application G.

Further to this example, when the user desires the functionality (or has an intent) to share content items (e.g., video, audio, images, etc.), the user could have a set of associated users (e.g., friends, contacts, circle members, followers, etc.) on the Centralized Application G and/or Specialized Application P, which may or may not be the same set of associated users. The user can easily share content items from Specialized Application P to the set of associated users on Centralized Application G, because the user is already signed into Centralized Application G. As a result, Specialized Application P benefits from providing the user with the option to sign in with Centralized Application G, because content from Specialized Application P is more likely to be shared (due to ease of sharing), thus driving additional traffic to Specialized Application P.

Also further to this example, when a user interacts with a content item on Centralized Application G, the user can be provided with recommended applications for sharing the content item to. According to implementations, if the user has signed into Specialized Application P with Centralized Application G, then Centralized Application G can recommend that the user share the content item, e.g., to associated users, on Specialized Application P. Centralized Application G could recommend Specialized Application P only or could recommend Specialized Application P more highly than other applications for sharing content to. As a result, Centralized Application G benefits from the user signing in to Specialized Application P through Centralized Application G, because content from Centralized Application G is more likely to be shared (due to ease of sharing) on Specialized Application P, thus driving additional traffic to Centralized Application G.

According to implementations, a centralized application could recommend to users specialized applications with other functionalities (or to fulfill other intents), such as editing a photo, playing a video, opening a web page, obtaining travel directions, purchasing an item, storing data, etc., based on the functionality of the specialized application and whether the user signed onto the specialized application.

For example, a user has an intent to purchase an item (or desires the functionality to purchase the item), and the user has previously signed into retail websites Application A, Application B, and Application C (which all sell the item) with Centralized Application G. The user then searches for the item to purchase using Centralized Application G. Because the user has previously signed into Application A, Application B, and Application C with Centralized Application G, Centralized Application G can rank Application A, Application B, and Application C higher in a list of recommended applications where the user can purchase the item. In other words, Application A, Application B, and Application C can be listed before other retail web sites in the list of retail websites where the user can purchase the item. Application A, Application B, and Application C benefit from offering the user the option to sign in through Centralized Application G, because they will be ranked higher than other applications where the user has not signed in through Centralized Application G. Further, the user can benefit by signing into Application A, Application B, and Application C through Centralized Application G. Because the user has signed into Application A, Application B, and Application C, the user is more likely to be a frequent user of these applications. Therefore, the user would likely prefer that these applications be ranked higher in the list of recommended applications.

In implementations, a centralized application can provide a specific functionality via a set of applications, and can mutate or order this set of applications based on the login state of the user. A list of functionalities, such as promoting purchasing intents, sharing content, or searching for a term or phrase, can be generated and curated by the centralized application based on the specialized applications that the user has logged into. For example, for a specific functionality, specialized applications where the user is logged in can be ranked higher in the order than specialized applications where the user is not logged in. In an implementation, specialized applications are recommended or access to the specialized applications is provided only when the user has logged in via a centralized application. In another implementation, specialized applications where the user has logged in via the centralized application are ranked higher than other specialized applications where the user has not logged in via the centralized application. In an implementation, ranking according to a login state can be combined with other ranking strategies, such as recentness or frequency of access of the application. In implementations, ranking of specialized applications for sharing content from a centralized application can also be based on whether content items previously shared by that user on the specialized application were re-shared, the actions previously taken by the user on the specialized application, whether the user was referred to the centralized application by the specialized application, and whether the user was consuming content from the centralized application embedded on the specialized application.

In an implementation, if the user selects a recommended specialized application where the user has logged in via a centralized application, the user is directed to a specific page (e.g., a sharing page or a page for a particular product rather than a home or start screen) to satisfy the particular functionality offered to or desired by the user.

In an implementation, a centralized application provides a login mechanism to be implemented by specialized applications to allow their users' login via the centralized application. For example, this login mechanism can be in the form of application programming interfaces (API) for third party applications (e.g., specialized applications) and could include one or more web pages as part of each API. The API could encompass the creation, storage and trading tokens used to identify and validate the user. The API could also include various security features, such as private and/or secret keys used to distinguish third party applications from each other.

Further, the centralized application can track which third party applications a user has signed into or if the user has signed into a particular third party application. For example, the tracking (referred to herein as an "oracle" mechanism) can involve recording sign in or log in states for a user for each third party application in a data store or database, and querying the data store to determine the third party applications that the user has signed into or logged into.

Furthermore, a set of specialized applications that are suitable for execution or implementation of a functionality desired by or offered to the user can be identified. A ranking system of the centralized application can then determine a ranking of the specialized applications of the set according to the sign in or log in status of the user (e.g., using the above oracle mechanism). In an implementation, the set of specialized applications can be also sorted or curated based on information about the user such as user location, user device, login history, etc. A list of specialized applications from the set based on the ranking can then be provided to the user, such that the user can select one (or more) of the specialized applications to execute or fulfill the functionality.

In an implementation, the user's last authentication and use of the specialized applications can be used to modify the ranking of the applications, e.g., such that specialized applications utilized more frequently or more recently can be ranked higher than other specialized applications. In implementations, only specialized applications that the user is currently signed into or logged into are included in the list of specialized applications, or specialized applications that the user is currently signed into or logged into are ranked higher than other specialized applications that the user is not signed into or logged into. Ranking strategies using other factors, such as affiliations, costs, specialized application performance, popularity, etc., can also be used to modify the ranking.

In another example, the sign in or log in status of the user can be used to rank mobile applications intended to fulfill user intent or provide specific functionality. In a particular example, a user may install a number of applications on a mobile device, such as applications that allow the user to edit videos. Some of these video editing applications may allow the user to sign in or log into the application. Further to this example, the user has recorded a video and desires to edit that video. Because the user has just completed recording the video, and the video may even still be displayed on the mobile device, the user may be provided with a list of applications on the mobile device that can edit the video. Alternatively, the user may indicate that the user would like to be provided with a list of applications on the mobile device than can edit the video. In implementations, rather than providing the user with a list of all of the applications on the mobile device that can edit the video, the user is provided with a list of applications that are ranked based on whether the user is signed in or logged into the application. Here, the user is likely to be provided with an application that that the user will find useful, because the user has previously signed in or logged into the application.

Unlike strategies including filtering or ranking general feed items or browsable content (e.g., a list of games in an app store), the combination of the specific functionality and the login state of the user on the application can provide useful information in the selection of a suitable application, according to implementations. Further, once selected, the application can open to a specific page, such as a sharing page or a page for a particular product, that is suited to satisfy the functionality desired by the user.

Figure 1:
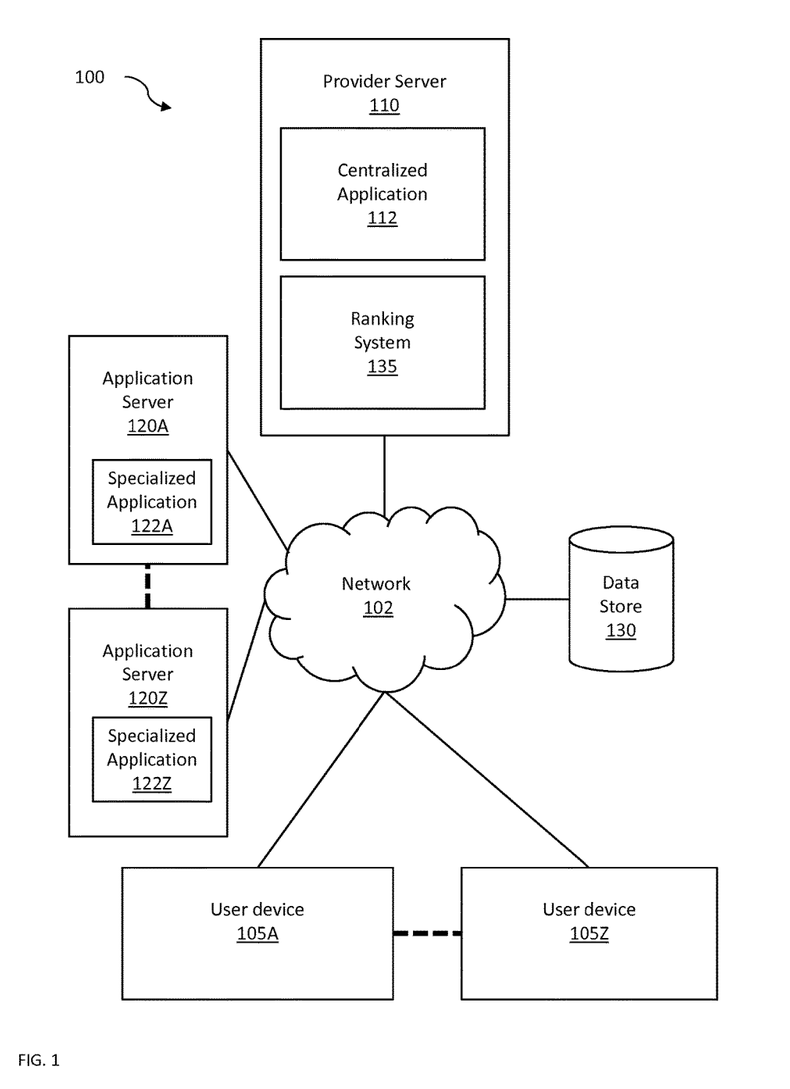
FIG. 1 illustrates exemplary system architecture, in accordance with one embodiment of the present disclosure.

FIG. 1 illustrates exemplary system architecture 100, in accordance with one embodiment of the present disclosure. System 100 includes user devices 105A through 105Z a provider server 110, one or more application servers 120A through 120Z, and a data store 130 in communication (e.g., coupled) over a network 102. The network 102 may be a private network (e.g., a local area network (LAN), a wide area network (WAN), intranet, etc.), a corporate network (e.g., a private network for an organization such as a corporation), a broadcast network, a public network (e.g., the Internet), a wired network (e.g., Ethernet network), a wireless network (e.g., an 802.11 network) and/or a cellular network (e.g., a Long Term Evolution (LTE) network).

The user devices 105A through 105Z may be any type of computing device, for example, a device including a processor, a computer-readable medium, and a memory. In some embodiments, the user device 105A through Z may be executing a browser application or other application adapted to communicate over Internet related protocols (e.g., TCP/IP and HTTP) and/or display a user interface. System 100 may support a large number of concurrent sessions with many client/user devices.

Each user device 105A through 105Z can include a media viewer. In one implementation, the media viewers may be applications that allow users to view content, such as images, videos, web pages, documents, etc. For example, the media viewer may be a web browser that can access, retrieve, present, and/or navigate content (e.g., web pages such as Hyper Text Markup Language (HTML) pages, digital media items, etc.) served by a web server. The media viewer may render, display, and/or present the content (e.g., a web page, a media viewer) to a user. The media viewer may also display an embedded media player (e.g., a Flash® player or an HTML5 player) that is embedded in a web page (e.g., a web page that may provide information about a product sold by an online merchant). In another example, the media viewer may be a standalone application that allows users to view digital media items (e.g., digital videos, digital images, electronic books, etc.). The media viewers may be provided to the user devices 105A through 105Z by the provider server 110 and/or the application servers 120A through 120Z. For example, the media viewers may be embedded media players that are embedded in web pages provided by the provider server 110. In another example, the media viewers may be applications that are downloaded from another server.

The provider server 110 and the application servers 120A through 120Z may include computing devices that have a wide range of processing capabilities such a personal computer (PC), a server computer, a personal digital assistant (PDA), a smart phone, a laptop computer, a netbook computer, a tablet device, and/or any machine capable of executing a set of instructions (sequential or otherwise) that specify actions to be taken by that machine. Embodiments of the disclosure may operate within a single server device or on multiple server devices.

In one embodiment, the provider server 110 provides a social network and/or content including media items (e.g., digital video, streaming video, images, digital music, streaming music, social media information, digital images, photographs, etc.) to one or more of the user devices 105A through 105Z. For example, the provider server 110 may host a centralized application 112 that can provide, for example, a content sharing platform that may provide a media item, such as a streaming video, requested by a user for playback on the user devices 105A through 105Z via the network 102. In another example, centralized application 112 can provide a social network (SN) that may present to a user a listing (e.g., activity feed, feed, stream, wall, etc.) of objects (such as posts, content items (e.g., video, images, audio, etc.), status updates, favorability indications, tags, messages, and so on) generated by other users of the social network. The centralized application 112 may also include a content sharing aspect that allows users to upload, view, tag, and share content, such as text content, video content, image content, audio content, and so on. Other users of the centralized application 112 may comment on the shared content, discover new content, locate updates, share content, and otherwise interact with the provided content. Users may be affiliated with or associated with other users via the centralized application 112.

In one embodiment, the application servers 120A through 120Z host specialized applications that provide various functionalities to users of user devices 105A though 105Z. For example, the application servers 120A through 120Z can host specialized applications, such as video editing applications, online retail websites, search engine applications, lifestyle content sharing services, encyclopedia-type content services, cloud computing services, online payment or banking services, travel directions services, etc. The application servers 120A through 120Z may be one or more computing devices (e.g., servers), data stores, networks, software components, and/or hardware components that may be used to allow users to connect to, share information, and/or interact with each other via the specialized applications 122.

Data store 130 can include one or more writable persistent storage devices, such as memories, tapes or disks. Although each of provider server 110, application servers 120A through 120Z, and data store 130 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

Centralized application 112 may have a ranking system 135 that may be part of the centralized application 112 or another application and operate in cooperation with the centralized application 112. During operation of system 100, the ranking system 135 can rank specialized applications 122A through 122Z provided by application servers 120A through 120Z, respectively, for use to fulfill an intent or provide a functionality to a user of one of the user devices 105A through 105Z. In an example, a user of user device 105A can sign into specialized application 122A with sign in information (e.g., a user name and password) for centralized application 112, which can be recorded by the ranking system 135 (e.g., in a database in data store 130). For example, specialized application 122A can be a lifestyle content sharing service and centralized application 112 is a general content sharing platform. In other examples, specialized application 122A can be a retail website, directions providing application, an encyclopedia type website, a cloud storage application, an online payment application, etc, and centralized application 112 can be a general search engine, a social networking application, an online communications application, etc.

The user may then access centralized application 112 to perform an action. Further to the example above where the specialized application 122A is a lifestyle content sharing service and centralized application 112 is a general content sharing platform, the user may access the centralized application 112 to view certain content.

The centralized application 112 may then invoke the ranking system 135 to determine a list of specialized application, e.g., from amongst specialized applications 122A through 122Z that can provide a desired functionality, or fulfill a user intent. For example, the user may request a list of specialized applications to provide the functionality or the ranking system 135 may identify a functionality based on an action by the user. The ranking system 135 can rank the specialized applications 122A through 122Z based on the sign in status of the user (e.g., which was stored in the database by the ranking system 135). For example, specialized applications that the user is signed into (e.g., with sign in information for centralized application 112 or with any other sign in information) can be ranked higher than applications that the user is not signed into (e.g., not signed in at all or not signed in with sign in information for centralized application 112). The ranking system 135 can then provide this ranked list to the user for the user to choose, if desired, an application to perform the functionality. In implementations, the ranked list of specialized applications that is provided to the user only includes applications that the user is signed into, or the list includes other applications that can perform the functionality and applications that the user is signed into are ranked higher than applications that the user is not signed into.

Further to the example above, since the user is viewing content, the ranking system 135 may automatically provide the user with a recommended list of applications that perform the functionality of sharing the content. In this example, because the user is signed into specialized application 122A, the user is either provided with a recommendation to share the content via specialized application 122A, or the user may be provided with other applications that provide for sharing of the content and specialized application A is ranked first because the user is signed into application A and not signed into the other applications.

Though the ranking system 135 is shown as a part of provider system 110, ranking system 135 can be a separate system 135.

Figure 2:
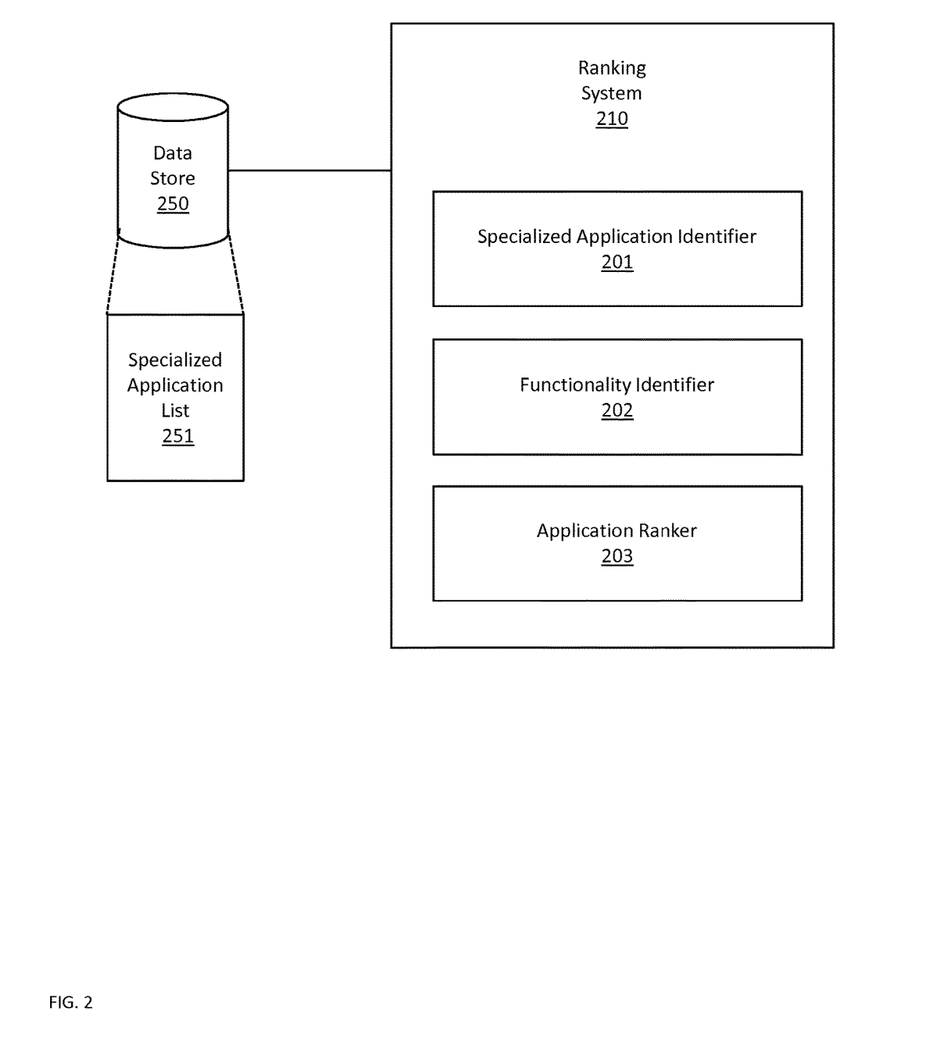
FIG. 2 illustrates a ranking system, in accordance with one embodiment of the present disclosure.

FIG. 2 illustrates a ranking system 210, in accordance with one embodiment of the present disclosure. The ranking system 210 may include a specialized application identifier 201, a functionality identifier 202, and an application ranker 203. More or less components may be included in the ranking system 210 without loss of generality. In an embodiment, ranking system 210 is ranking system 135 and data store 250 is data store 130 shown in FIG. 1.

In an implementation, the specialized application identifier 201 identifies specialized applications that a user has signed into via centralized application sign in information, and this information can be stored in specialized application list 251 in data store 250. The specialized application identifier 201 can also store information about the functionalities that the specialized applications provide (or intents that the applications can fulfill).

In an implementation, based on an action of the user on the centralized application, the functionality identifier 202 identifies a functionality (or intent) for the user. The functionality can be identified based on a request from the user, or the functionality can be identified as a functionality that the user is likely to desire based on the user's action. For example, if the user performs the action of viewing a video, the functionality identifier 202 could predict that the user might want to perform the function of sharing the video with other users associated with the user.

The functionality identifier 202 can then identify specialized applications that perform the identified functionality that the user is signed into via the centralized application, e.g., from the specialized application list 251. The functionality identifier 202 can also identify other specialized applications that perform the identified functionality, but that the user is not signed into via the centralized application.

The application ranker 203 can then rank the specialized applications that were identified by the functionality identifier 202. For example, application ranker 203 can rank the specialized applications that the user had signed into via the centralized application higher than the specialized applications that the user had not signed into via the centralized application.

The application ranker 203 can then provide a list of recommended applications for performing the functionality to the user. In an implementation, the list includes only applications that the user has signed into via the centralized application. In another implementation, the list includes other applications that can perform the functionality, but applications that the user signed into via the centralized application are ranked higher on the list than applications that the user did not sign into via the centralized application.

Figure 3:
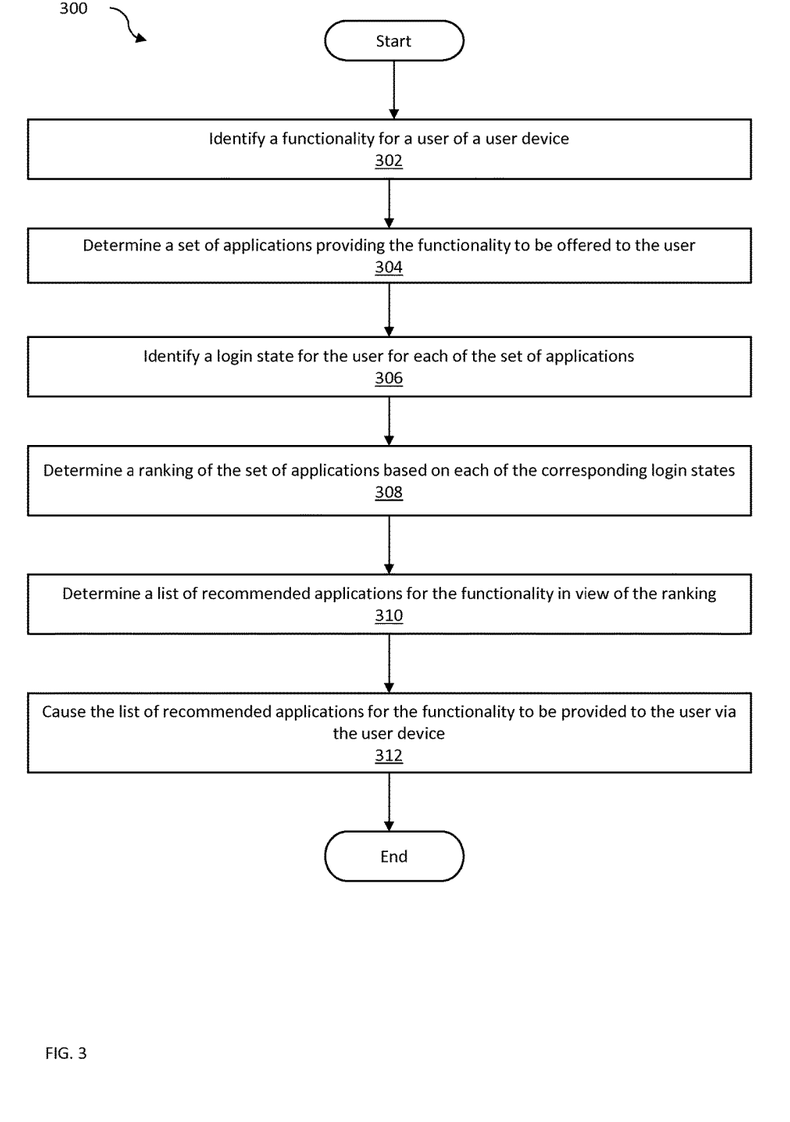
FIG. 3 is a flow diagram illustrating one embodiment for a method of ranking applications.

FIG. 3 is a flow diagram illustrating an embodiment for a method 300 of ranking applications. The method 300 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 300 is performed by a server (e.g., the provider server 110 of FIG. 1).

At block 302, processing logic identifies a functionality (or intent) for a user of a user device. For example, the user has requested that an Internet search be performed via a search engine of a centralized application for polarized sunglasses to buy. Here, the functionality desired by the user is for a search to be performed on the Internet using the term "buy polarized sunglasses".

At block 304, processing logic determines a set of applications providing the functionality desired by the user. Further to the example above, the search engine performs an Internet search based on the search term "buy polarized sunglasses". The search results include a list of retailer website applications for Retailer P, Retailer Q, Retailer R, Retailer S, Retailer T, and Retailer U, which all offer polarized sunglasses for sale.

At block 306, processing logic identifies a login state for the user for each of the set of applications. In an implementation, a login state for the user for each of the set of applications can be determined via a database where a list of applications that the user is logged into is stored. In an implementation, whether the user logged into the application via a centralized application can also be determined.

Further to the example, whether the user is logged into (e.g., via a centralized application) the retailer website applications identified during the Internet search can be determined. In this example, it is determined that the user has logged into the retail website applications of Retailer S and Retailer T via the centralized application.

At block 308, processing logic determines a ranking of the set of applications based on each of the corresponding login states. In an implementation, applications that the user is already logged into are ranked higher than applications that the user is not logged into. In an implementation, specialized applications that the user is already logged into via a centralized application are ranked higher than specialized applications that the user is not logged into via a centralized application. In implementations, the ranking can be further refined based on other factors such as the actions that the user has taken on the application, the recentness of the user's interaction with the application, whether the user was referred to the application by the centralized application, whether content shared by the user via the application was re-shared, etc.

Further to the example, the website applications of Retailer S and Retailer T are ranked above the web site applications of Retailer P, Retailer Q, Retailer R, and Retailer U, because the user has logged onto Retailer S and Retailer T via the centralized application. Further, the website application of Retailer S is ranked above the website application of Retailer T because the user has accessed the website application of Retailer S more recently than the website application of Retailer T.

At block 310, processing logic determines a list of recommended applications for the desired functionality in view of the ranking. In an implementation, the list of recommended applications includes only applications that the user is logged into, or logged into via a centralized application. In another implementation, the list of recommended applications includes other applications that provide the identified functionality, but applications where the user has already logged in are ranked higher than applications where the user is not logged in.

Further to the example, the list of recommended applications for the user could include the retail website applications of Retailer S and Retailer T. In another example, the list of recommended applications for the user could be ordered as follows: (1) Retailer S, (2) Retailer T, (3) Retailer P, (4) Retailer Q, (5) Retailer R, and (6) Retailer U.

At block 312, processing logic causes the list of recommended applications for the functionality to be provided to the user via the user device.

Further to the example above, the user is provided with the Internet search results for the term "buy polarized sunglasses" where the list of retailer website applications that will perform the functionality of allowing the user to buy polarized sunglasses is ordered as (1) Retailer S, (2) Retailer T, (3) Retailer P, (4) Retailer Q, (5) Retailer R, and (6) Retailer U.

Figure 4A:
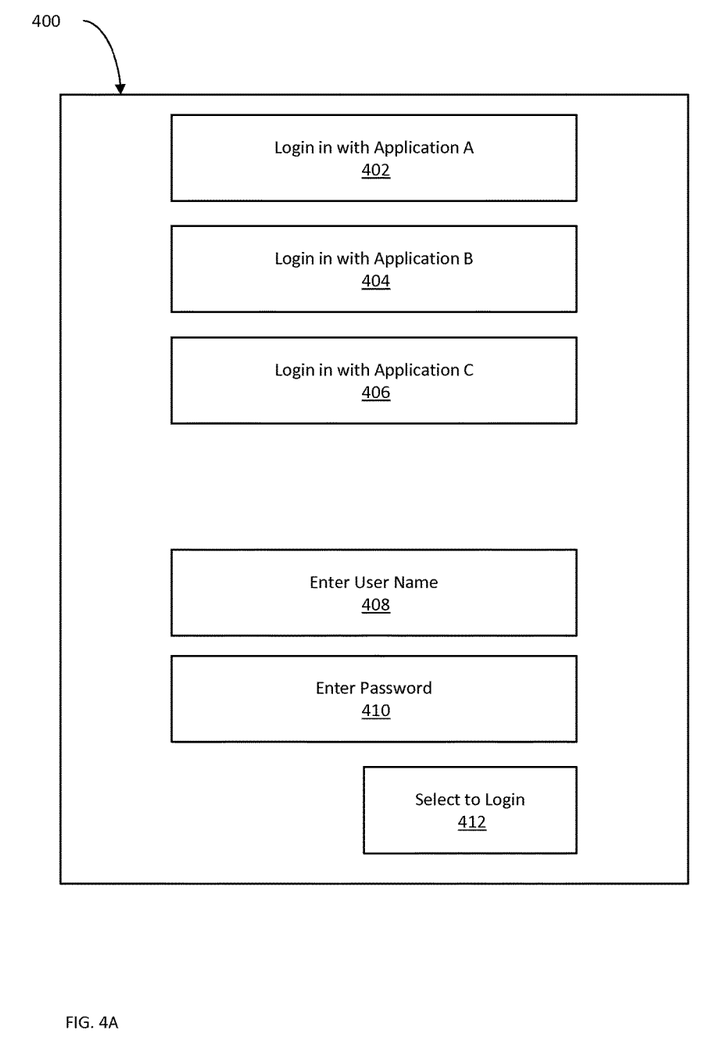
FIG. 4A illustrates a user interface for selecting to login in with an application according to one embodiment.

FIG. 4A illustrates a graphical user interface 400 for a third party (or specialized) application, according to an embodiment (e.g., on a display of the user device 105A through 105Z of FIG. 1). The graphical user interface 400 can include UI controls (e.g. buttons, links, etc.) for logging into the specialized application via various applications (e.g., centralized applications) including, for example, a UI control 402 for logging in via Application A, a UI control 404 for logging in via Application B, and a UI control 406 for logging in via Application C. The third party application can also include a portion 408 for entering a user name, a portion 410 for entering a password, and a login selector 412, such that a user can log directly into the third party application rather than logging in via a centralized application.

Figure 4B:
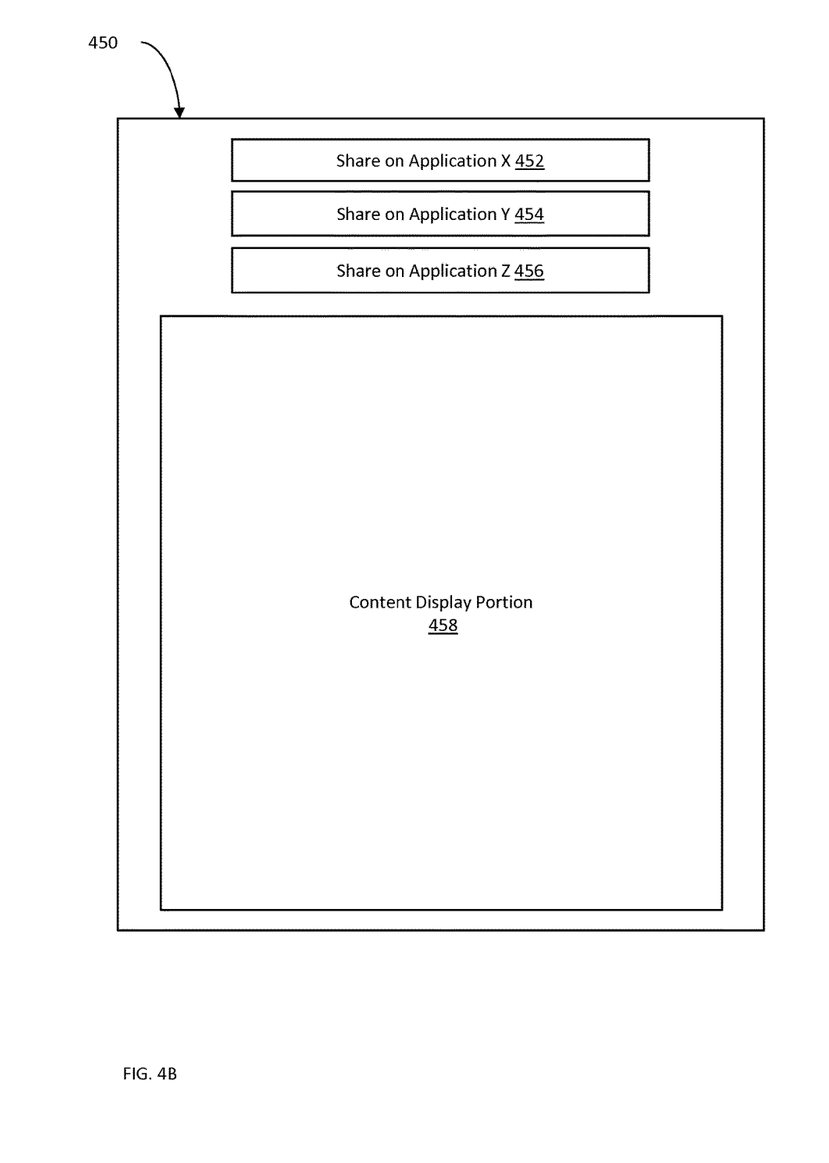
FIG. 4B illustrates a user interface for selecting an application for sharing content according to one embodiment.

FIG. 4B illustrates a graphical user interface 450 for a centralized application according to an embodiment (e.g., on a display of the user device 105A through 105Z of FIG. 1). For example, the centralized application can be a content sharing service, where content is presented a content display portion (e.g, a media viewer) 458. The centralized application can then provide recommended specialized applications to the user for sharing the presented content with other users, including for example, a UI control 452 for sharing the content through Application X, a UI control 454 for sharing the content through Application Y, and a UI control 456 for sharing the content through Application Z. In implementations, Application X, Application Y, and Application Z are provided as suggested applications for sharing the content because the user has logged into these application via the centralized application.

Figure 5:
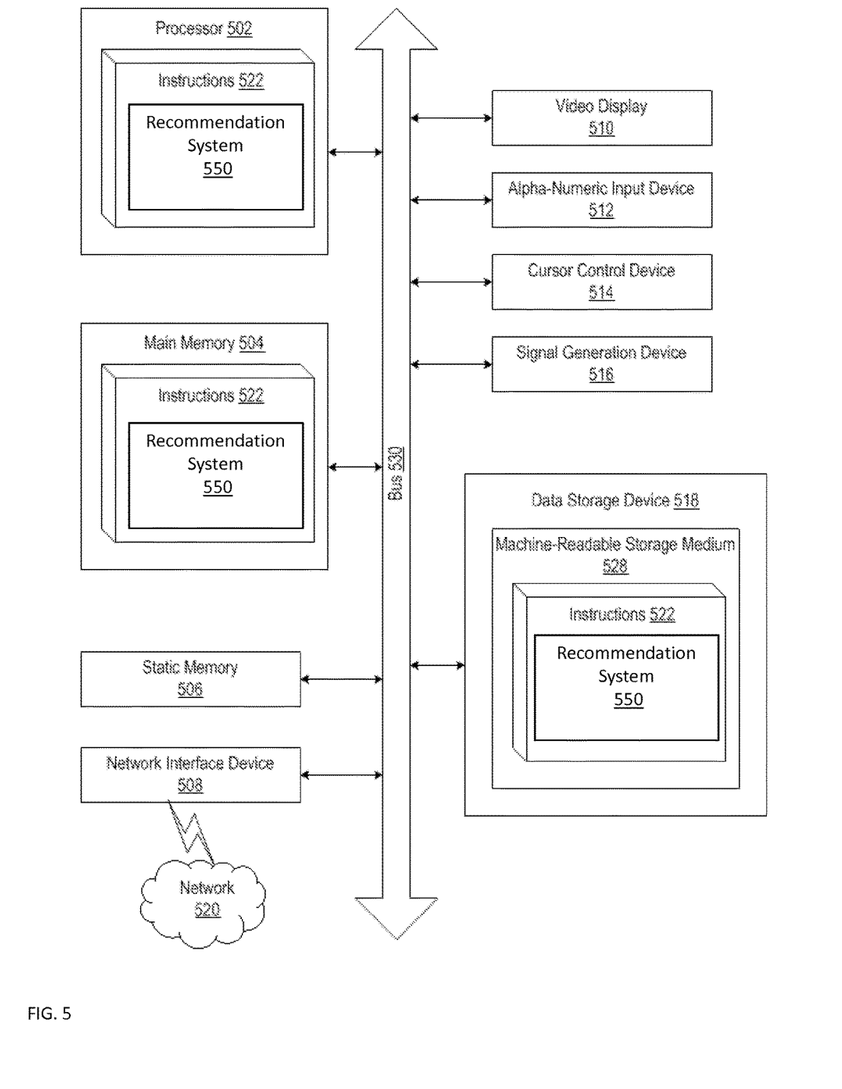
FIG. 5 is a block diagram of an exemplary computer system that may perform one or more of the operations described herein.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 528 (or machine-readable storage medium) on which is stored one or more sets of instructions 522 (e.g., software) embodying any one or more of the methodologies or functions described herein. The instructions 522 may also reside, completely or at least partially, within the main memory 504 and/or within the processor 502 during execution thereof by the computer system 500, the main memory 504 and the processor 502 also constituting computer-readable storage media. The instructions 522 may further be transmitted or received over a network 520 via the network interface device 508.

In one embodiment, the instructions 526 include instructions for a ranking system 550, which may correspond to ranking system 135 of FIG. 1, and/or a system for ranking applications. While the computer-readable storage medium 528 (or machine-readable storage medium) is shown in an exemplary embodiment to be a single medium, the term "computer-readable storage medium" (or "machine-readable storage medium") should be taken to include a single medium or multiple media (e.g., a centralized or distributed database, and/or associated caches and servers) that store the one or more sets of instructions. The term "computer-readable storage medium" (or "machine-readable storage medium") shall also be taken to include any medium that is capable of storing, encoding or carrying a set of instructions for execution by the machine and that cause the machine to perform any one or more of the methodologies of the present disclosure. The term "computer-readable storage medium" (or "machine-readable storage medium") shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

We claim:

1. A method, implemented by a server, comprising:
    determining, by the server, a set of applications providing a particular functionality to be offered to a user of a user device;
    identifying, by the server, a login state for an application in the set of applications, wherein the login state indicates whether the user is logged into the application;
    determining, by the server, a ranking of the set of applications based on the login state of the application, wherein a rank of the application is higher than a rank of other applications in the set of applications when the login state indicates the user is logged into the application;
    determining, by the server, a list of recommended applications for the particular functionality in view of the ranking; and
    causing, by the server, the list of recommended applications to be provided to the user via the user device.

2. The method of claim 1, wherein the particular functionality is to search for a term, and wherein the set of applications comprises search engine applications.

3. The method of claim 1, wherein the particular functionality is to share a content item, and wherein the set of applications comprises content sharing services.

4. The method of claim 1, wherein the ranking is further based on an interaction history of the user with each application of the set of applications.

5. The method of claim 4, wherein the interaction history comprises an ordering of the set of application based on a last time of interaction of the user with each application of the set of applications.

6. The method of claim 1, wherein the list of recommended applications consists of applications that the user is logged into.

7. The method of claim 1, wherein applications that the user is logged into are ranked higher than applications that the user is not logged into.

8. The method of claim 1, further comprising identifying the particular functionality based on an action of the user on the user device.

9. The method of claim 1, further comprising receiving a request from the user for an application to provide the particular functionality.

10. The method of claim 1, wherein the login state for each application of the set of applications is identified based on whether the user is logged into the application via another application hosted by the server.

11. A non-transitory computer readable storage medium having instructions that, when executed by a processing device, cause the processing device to perform operations comprising:
    determining a set of applications providing a particular functionality to be offered to a user of a user device;
    identifying a login state for an application in the set of applications, wherein the login state indicates whether the user is logged into the application;
    determining a ranking of the set of applications based on the login state of the application, wherein a rank of the application is higher than a rank of other applications in the set of applications when the login state indicates the user is logged into the application;
    determining a list of recommended applications for the particular functionality in view of the ranking; and
    causing the list of recommended applications to be provided to the user via the user device.

12. The non-transitory computer readable storage medium of claim 11, wherein the ranking is further based on an interaction history of the user with each application of the set of applications.

13. The non-transitory computer readable storage medium of claim 11, wherein the ranking is further based on an interaction history of the user with each application of the set of applications, and wherein the interaction history comprises an ordering of the set of application based on a last time of interaction of the user with each application of the set of applications.

14. The non-transitory computer readable storage medium of claim 11, wherein applications that the user is logged into are ranked higher than applications that the user is not logged into.

15. The non-transitory computer readable storage medium of claim 11, wherein the operations further comprise identifying the particular functionality based on an action of the user on the user device.

16. The non-transitory computer readable storage medium of claim 11, wherein the login state for each application of the set of applications is identified based on whether the user logged into the application via another application hosted by a same server.

17. A computing device comprising:
    a memory; and
    a processing device coupled to the memory, wherein at least one of the memory and the processing device is implemented at least partially by hardware, and the processing device is configured to:
        determine a set of applications providing a particular functionality to be offered to a user of a user device;
        identify a login state for an application in the set of applications, wherein the login state indicates whether the user is logged into the application;
        determine a ranking of the set of applications based on the login state of the application, wherein a rank of the application is higher than a rank of other applications in the set of applications when the login state indicates the user is logged into the application;
        determine a list of recommended applications for the particular functionality in view of the ranking; and
        cause the list of recommended applications to be provided to the user via the user device.

18. The computing device of claim 17, wherein the ranking is further based on an interaction history of the user with each application of the set of applications.

19. The computing device of claim 17, wherein the ranking is further based on an interaction history of the user with each application of the set of applications, and wherein the interaction history comprises an ordering of the set of application based on a last time of interaction of the user with each application of the set of applications.

20. The computing device of claim 17, wherein the list of recommended applications consists of applications that the user is logged into.

21. The computing device of claim 17, wherein applications that the user is logged into are ranked higher than applications that the user is not logged into.

22. The computing device of claim 17, wherein the login state for each application of the set of applications is identified based on whether the user logged into the application via another application hosted by a same server.

* * * * *